United States Patent
Yonemura et al.

(10) Patent No.: US 11,821,432 B2
(45) Date of Patent: Nov. 21, 2023

(54) CENTRIFUGAL COMPRESSOR AND TURBOCHARGER

(71) Applicant: IHI Corporation, Tokyo (JP)

(72) Inventors: Atsushi Yonemura, Tokyo (JP); Ryota Sakisaka, Tokyo (JP); Takashi Fujiwara, Tokyo (JP); Takahiro Bamba, Tokyo (JP)

(73) Assignee: IHI Corporation, Tokyo (JP)

( * ) Notice: Subject to any disclaimer, the term of this patent is extended or adjusted under 35 U.S.C. 154(b) by 131 days.

(21) Appl. No.: 17/491,736

(22) Filed: Oct. 1, 2021

(65) Prior Publication Data

US 2022/0018360 A1 Jan. 20, 2022

Related U.S. Application Data

(63) Continuation of application No. PCT/JP2020/013848, filed on Mar. 26, 2020.

(30) Foreign Application Priority Data

Apr. 26, 2019 (JP) .................. 2019-086357

(51) Int. Cl.
*F04D 17/10* (2006.01)
*F02C 6/12* (2006.01)
(Continued)

(52) U.S. Cl.
CPC .............. *F04D 17/10* (2013.01); *F02B 37/00* (2013.01); *F02C 6/12* (2013.01); *F04D 29/464* (2013.01);
(Continued)

(58) Field of Classification Search
CPC ........ F04D 17/10; F04D 29/464; F02B 37/00; F02C 6/12; F05D 2220/40; F05D 2250/51
See application file for complete search history.

(56) References Cited

U.S. PATENT DOCUMENTS

2015/0354591 A1 12/2015 Ibaraki et al.
2017/0298943 A1 10/2017 Mohtar et al.
2020/0063751 A1 2/2020 Iwakiri et al.

FOREIGN PATENT DOCUMENTS

CN 1680683 A 10/2005
DE 102017216256 B3 * 3/2019 ......... F04D 27/0207
(Continued)

OTHER PUBLICATIONS

Japanese Office Action dated Feb. 7, 2023 in Japanese Patent Application No. 2021-515899, 3 pages.
(Continued)

*Primary Examiner* — Audrey B. Walter
(74) *Attorney, Agent, or Firm* — Oblon, McClelland, Maier & Neustadt, L.L.P.

(57) ABSTRACT

A centrifugal compressor includes: an impeller including a main body portion and a plurality of blades provided on an outer peripheral surface of the main body portion; an intake flow path facing the impeller in a rotational axis direction; and a throttling mechanism including a throttling member provided in the intake flow path, a ratio obtained by dividing a distance between an outer peripheral end of a leading edge of the blade and the throttling member by a maximum protruding height of the throttling member protruding from an inner wall surface of the intake flow path is equal to or less than 4.

8 Claims, 11 Drawing Sheets

(51) Int. Cl.
*F04D 29/46* (2006.01)
*F02B 37/00* (2006.01)
(52) U.S. Cl.
CPC ...... *F05D 2220/40* (2013.01); *F05D 2250/51* (2013.01)

(56) References Cited

FOREIGN PATENT DOCUMENTS

| JP | 05-256149 A | 10/1993 |
| JP | 2009-236035 A | 10/2009 |
| JP | 2010-174806 A | 8/2010 |
| JP | 2011-202574 A | 10/2011 |
| JP | WO 2014/128931 A1 | 8/2014 |
| JP | 2016-94840 A | 5/2016 |
| JP | 2016-173051 A | 9/2016 |
| JP | 2017-20514 A | 1/2017 |
| JP | 2019-7425 A | 1/2019 |
| WO | WO 2014/033878 A1 | 3/2014 |
| WO | WO 2018/147128 A1 | 8/2018 |
| WO | WO 2019/052729 A1 | 3/2019 |

OTHER PUBLICATIONS

International Search Report dated Jun. 9, 2020 in PCT/JP2020/013848, filed on Mar. 26, 2020, 2 pages.
Combined Chinese Office Action and Search Report dated Apr. 19, 2023 in Chinese Application No. 202080031019.6, 6 pages.

\* cited by examiner

CENTRIFUGAL COMPRESSOR AND TURBOCHARGER

CROSS REFERENCE TO RELATED APPLICATIONS

This application is a continuation application of International Application No. PCT/JP2020/013848, filed on Mar. 26, 2020, which claims priority to Japanese Patent Application No. 2019-086357 filed on Apr. 26, 2019, the entire contents of which are incorporated by reference herein.

BACKGROUND ART

Technical Field

The present disclosure relates to a centrifugal compressor and a turbocharger.

Conventionally, a centrifugal compressor is provided in a turbocharger. For example, in a centrifugal compressor provided in a turbocharger described in Patent Document 1, an intake flow path is formed upstream of a compressor impeller. A throttling member is provided in the intake flow path. A plurality of throttling members is arranged in a circumferential direction of the compressor impeller. The throttling members are driven by an actuator and project radially inward into the intake flow path to narrow the intake flow path.

CITATION LIST

Patent Literature

Patent Literature 1: JP 2016-173051 A

SUMMARY

Technical Problem

By narrowing the intake flow path with a throttling member, a decrease in thermal insulation efficiency at low flow rates can be curbed. It is desirable to develop a technology to further curb the decrease in thermal insulation efficiency when the intake flow path is narrowed as such.

The purpose of the present disclosure is to provide a centrifugal compressor and a turbocharger that can curb the decrease in thermal insulation efficiency.

Solution to Problem

In order to solve the above problem, a centrifugal compressor according to one aspect of the present disclosure comprises an impeller including a main body portion and a plurality of blades provided on an outer peripheral surface of the main body portion; an intake flow path facing the impeller in a rotational axis direction; and a throttling mechanism including a throttling member provided in the intake flow path, a ratio obtained by dividing a distance between an outer peripheral end of a leading edge of the blade and the throttling member by a maximum protruding height of the throttling member protruding from an inner wall surface of the intake flow path is equal to or less than 4.

The throttling member may include an opposing surface facing the outer peripheral end in an axial direction of the impeller, and the opposing surface may be located between a position of the outer peripheral end and a position of an inner peripheral end of the leading edge in the axial direction.

In order to solve the above problem, a turbocharger according to another aspect of the present disclosure comprises the above centrifugal compressor.

Effects of Disclosure

According to the present disclosure, it is possible to curb the decrease in thermal insulation efficiency.

DESCRIPTION OF EMBODIMENTS

An embodiment according to the present disclosure is described in detail below with reference to the accompanying drawings. Specific dimensions, materials, and numerical values, etc. shown in the embodiment are merely examples for a better understanding and do not limit the present disclosure, unless noted otherwise. In this document and the figures, elements having substantially the same functions and configurations are indicated with the same reference to omit redundant explanations. In addition, elements not directly related to the present disclosure are omitted from the figures.

Figure 1:
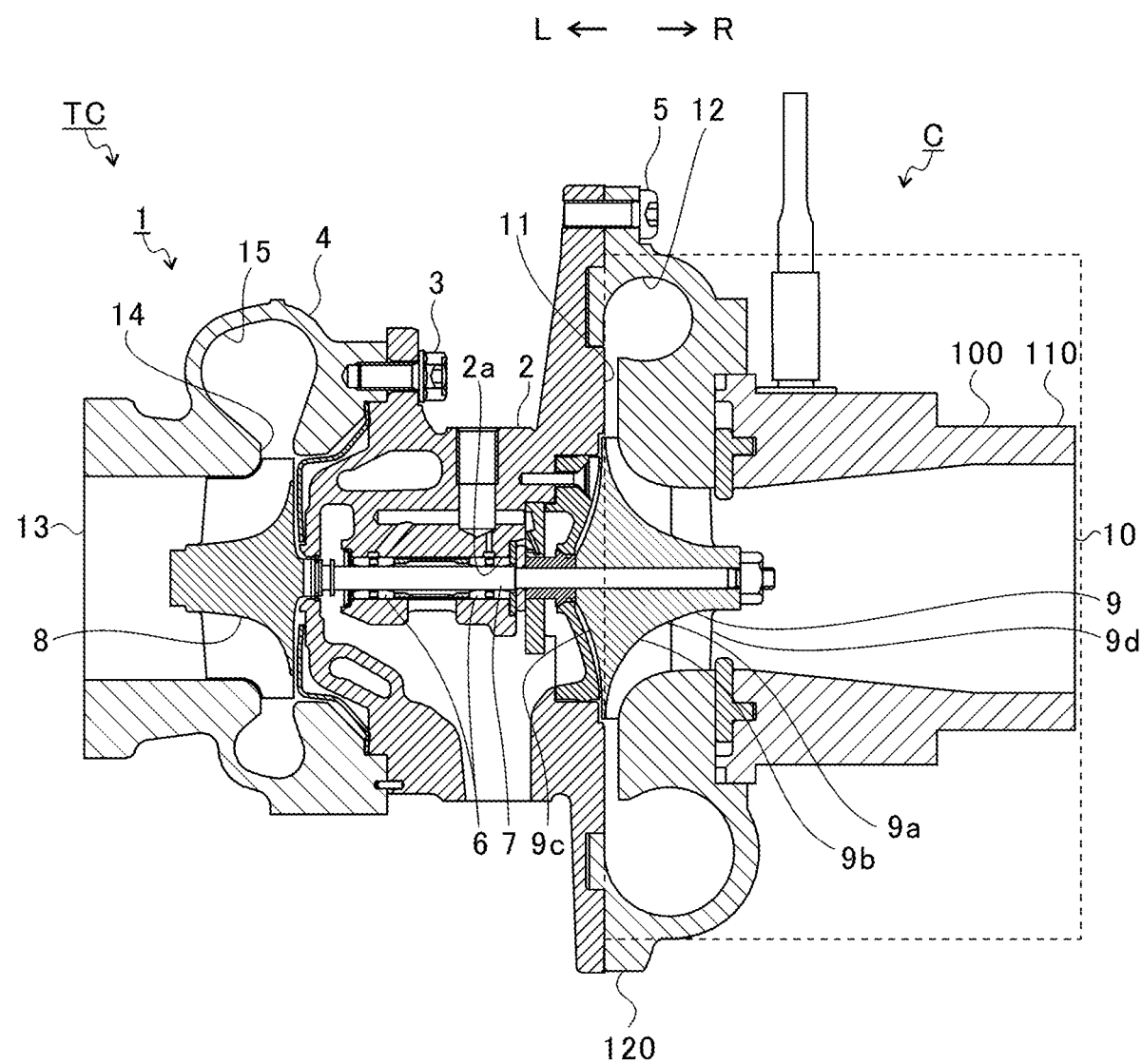
FIG. 1 shows a schematic cross-sectional view of a turbocharger.

FIG. 1 shows a schematic cross-sectional view of a turbocharger TC. A direction indicated by an arrow L shown in FIG. 1 is a left side of the turbocharger TC. A direction indicated by an arrow R shown in FIG. 1 is a right side of the turbocharger TC. As shown in FIG. 1, the turbocharger TC comprises a turbocharger body 1. The turbocharger body 1 includes a bearing housing 2. A turbine housing 4 is connected to the left side of the bearing housing 2 by fastening bolts 3. A compressor housing 100 is connected to the right side of the bearing housing 2 by fastening bolts 5.

A accommodation hole 2a is formed in the bearing housing 2. The accommodation hole 2a passes through the bearing housing 2 in the left-right direction of the turbocharger TC. A bearing 6 is provided in the accommodation hole 2a. In FIG. 1, a full-floating bearing is shown as an example of the bearing 6. However, the bearing 6 may be any other radial bearing, such as a semi-floating bearing or a rolling bearing. A shaft 7 is rotatably supported by the bearing 6. A turbine impeller 8 is provided at a left end of the shaft 7. The turbine impeller 8 is rotatably housed in the turbine housing 4. A compressor impeller 9 (impeller) is provided at a right end of the shaft 7.

The compressor impeller 9 includes a main body portion 9a. An outer peripheral surface 9b of the main body portion 9a faces one side in a rotational axis direction of the compressor impeller 9 (hereinafter simply referred to as the rotational axis direction). The outer peripheral surface 9b faces one side of the shaft 7 (axial direction of the shaft 7, left-right direction of the turbocharger TC). A back surface 9c faces the other side in the rotational axis direction. A plurality of blades 9d are provided on the outer peripheral surface 9b so as to be spaced apart in the circumferential direction of the outer peripheral surface 9b. The blade 9d protrudes in the radial direction from the outer peripheral surface 9b. The compressor impeller 9 is rotatably housed in the compressor housing 100. The compressor housing 100 has a first housing member 110 and a second housing member 120. The first housing member 110 and the second housing member 120 will be described in detail later.

An inlet 10 is formed in the compressor housing 100. The inlet 10 opens to the right side of the turbocharger TC. The inlet 10 is connected to an air cleaner (not shown). When the bearing housing 2 and the compressor housing 100 are connected by the fastening bolts 5, a diffuser flow path 11 is formed. The diffuser flow path 11 pressurizes air. The diffuser flow path 11 is formed in an annular shape from inside to outside in the radial direction of the shaft 7 (compressor impeller 9) (hereinafter simply referred to as the radial direction). The diffuser flow path 11 is connected to the inlet 10 via the compressor impeller 9 in the inner part of the radial direction.

A compressor scroll flow path 12 is formed inside the compressor housing 100. The compressor scroll flow path 12 has an annular shape. The compressor scroll flow path 12 is located outside the compressor impeller 9 in the radial direction. The compressor scroll flow path 12 is connected to an intake port of an engine (not shown). The compressor scroll flow path 12 is also connected to the diffuser flow path 11. When the compressor impeller 9 rotates, air is sucked into the compressor housing 100 from the inlet 10. The intake air is accelerated by centrifugal force when passing between the plurality of blades 9d of the compressor impeller 9. The accelerated air is pressurized in the diffuser flow path 11 and compressor scroll flow path 12. The pressurized air flows out of a discharge port (not shown) and is led to the intake port of the engine.

Accordingly, the turbocharger TC comprises a centrifugal compressor C (compressor). The centrifugal compressor C includes a compressor housing 100, a compressor impeller 9, and a compressor scroll flow path 12.

An exhaust port 13 is formed in the turbine housing 4. The exhaust port 13 opens to the left side of the turbocharger TC. The exhaust port 13 is connected to an exhaust gas purification system (not shown). The turbine housing 4 also includes a flow path 14 and a turbine scroll flow path 15. The turbine scroll flow path 15 is located outside the turbine impeller 8 in the radial direction. The flow path 14 is located between the turbine impeller 8 and the turbine scroll flow path 15.

The turbine scroll flow path 15 is connected to a gas inlet (not shown). Exhaust gas discharged from the exhaust manifold of the engine (not shown) is led to the gas inlet. The turbine scroll flow path 15 is also connected to the above flow path 14. The exhaust gas led from the gas inlet into the turbine scroll flow path 15 is directed to the exhaust port 13 through the flow path 14 and between the blades of the turbine impeller 8. The exhaust gas led to the exhaust port 13 rotates the turbine impeller 8 when passing therethrough.

The rotational force of the turbine impeller 8 is transmitted to the compressor impeller 9 via the shaft 7. As described above, the air is pressurized by the rotational force of the compressor impeller 9 and is led to the intake port of the engine.

Figure 2:
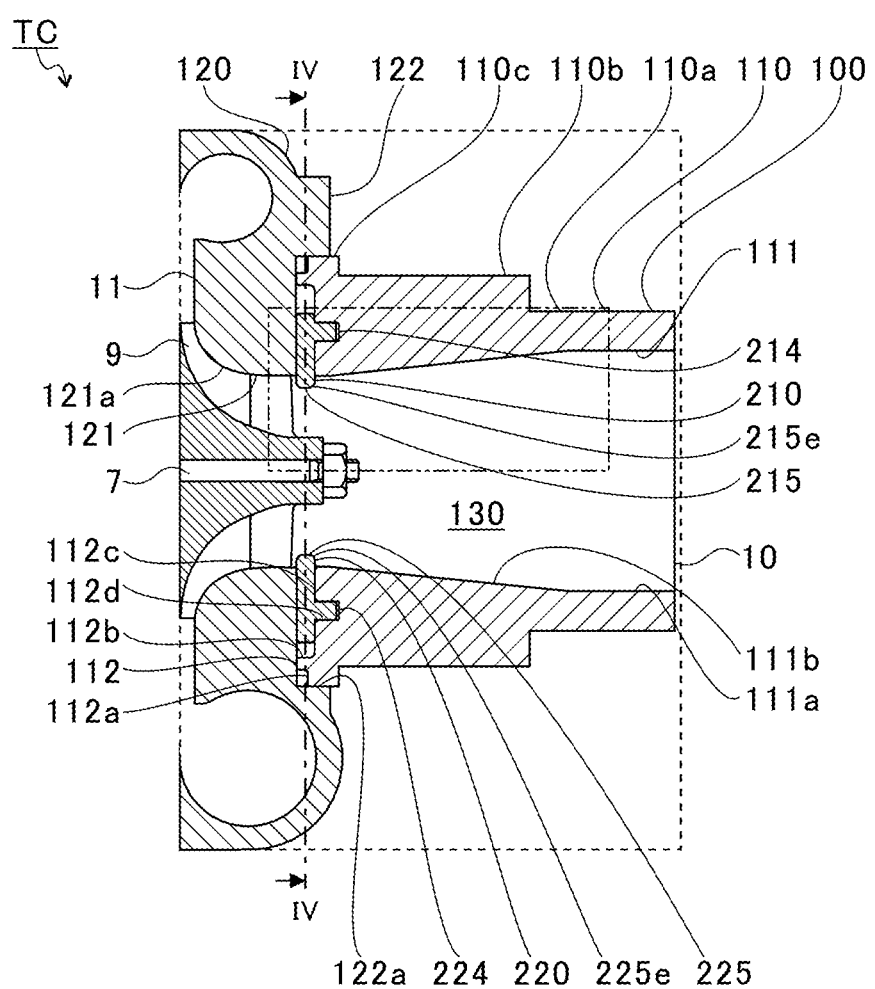
FIG. 2 shows an extraction of an area enclosed by a dashed line in FIG. 1.

FIG. 2 is an extraction of an area enclosed by a dashed line in FIG. 1. In FIG. 2, the compressor impeller 9, the compressor housing 100, and the throttling member (described later) are extracted and shown. As shown in FIG. 2, the first housing member 110 of the compressor housing 100 is located to the right side (away from the bearing housing 2) in FIG. 2 with respect to the second housing member 120.

The first housing member 110 has a substantially cylindrical shape. The first housing member 110 has a small diameter portion 110a, a medium diameter portion 110b, and a large diameter portion 110c. The small diameter portion 110a is the furthest from the bearing housing 2. The large diameter portion 110c is closest to the bearing housing 2. The medium diameter portion 110b is located between the small diameter portion 110a and the large diameter portion 110c. The small diameter portion 110a has a smaller outer diameter than that of the medium diameter portion 110b. The medium diameter portion 110b has a smaller outer diameter than that of the large diameter portion 110c. However, the first housing member 110 may not have the small diameter portion 110a, the medium diameter portion 110b, or the large diameter portion 110c. For example, the outer diameter may be substantially constant in the rotational axis direction.

A through hole 111 is formed in the first housing member 110. The through hole 111 penetrates the first housing member 110 in the rotational axis direction. The through hole 111 passes through the small-diameter portion 110a, the medium-diameter portion 110b, and the large-diameter portion 110c in the rotational axis direction. One end of the through hole 111 is the inlet 10 described above.

The through hole 111 has a parallel portion 111a and a tapered portion 111b. The parallel portion 111a is located closer to one end of the through hole 111 with respect to the tapered portion 111b. One end of the parallel portion 111a is the inlet 10. An inner diameter of the parallel portion 111a is substantially constant over the axial direction. One end of the tapered portion 111b is continuous to the parallel portion 111a. An inner diameter of one end of the tapered portion 111b is substantially equal to the inner diameter of the parallel portion 111a. The inner diameter of the tapered portion 111b decreases as moving away from the parallel portion 111a (closer to the second housing member 120).

A notch 112a is formed on the outer periphery of an end surface 112 of the first housing member 110 on a side closer to the second housing member 120. The notch 112a has, for example, an annular shape.

An accommodation groove 112b is formed on the end surface 112 of the first housing member 110. The accommodation groove 112b is recessed toward the inlet 10 (so as to be spaced apart from the second housing member 120) from the end surface 112. The accommodation groove 112b has, for example, a substantially annular shape when seen from the axial direction. In other words, the accommodation groove 112b is recessed radially outward from an inner wall of the through hole 111.

In the accommodation groove 112b, a bearing hole 112d is formed in a wall 112c on the inlet 10 side (small diameter portion 110a side, a side spaced apart from the second housing member 120). The bearing hole 112d extends from the wall 112c toward the inlet 10 in a direction parallel to the rotational axis direction. Two bearing holes 112d are provided so as to be spaced apart from each other in the rotational direction of the compressor impeller 9 (hereinafter simply referred to as the rotational direction). The two bearing holes 112d are arranged at positions spaced apart by 180 degrees in the rotational direction.

A through hole 121 is formed in the second housing member 120. The through hole 121 penetrates the second housing member 120 in the rotational axis direction. In the through hole 121, an inner diameter of an end closer to the first housing member 110 is substantially equal to an inner diameter of the through hole 111 at an end closer to the second housing member 120. In the second housing member 120, a shroud portion 121a is formed on an inner wall of the through hole 121. The shroud portion 121a faces the compressor impeller 9 from radially outside. An inner diameter of the shroud portion 121a increases as spaced apart from the first housing member 110. The end of the shroud portion 121a on the opposite side of the first housing member 110 is connected to the diffuser flow path 11 described above.

In the second housing member 120, an accommodation groove 122a is formed on an end surface 122 closer to the first housing member 110. The accommodation groove 122a is recessed toward the diffuser flow path 11 (so as to be spaced apart from the first housing member 110) from the end surface 122. The accommodating groove 122a has, for example, a substantially an annular shape when seen from the axial direction. In other words, the accommodation groove 122a is recessed radially outward from an inner wall of the through hole 121. The large diameter portion 110c is inserted into the accommodating groove 122a. In the accommodation groove 122a, the end surface 112 of the first housing member 110 contacts with a wall at the side of the diffuser flow path 11.

The through hole 111 of the first housing member 110 and the through hole 121 of the second housing member 120 define an intake flow path 130. The intake flow path 130 connects the inlet 10 and the diffuser flow path 11. The compressor impeller 9 is provided in the intake flow path 130. In the intake flow path 130 (through holes 111 and 121), the cross-sectional shape perpendicular to the rotational axis direction has, for example, a circular shape around the rotational axis of the compressor impeller 9. However, the cross-sectional shape of the intake flow path 130 is not limited thereto. An undescribed sealing member is arranged in the notch 112a of the first housing member 110. The sealing member curbs an amount of air leaking from the gap between the first housing member 110 and the second housing member 120. However, the notch 112a and the sealing member are not essential.

Figure 3:
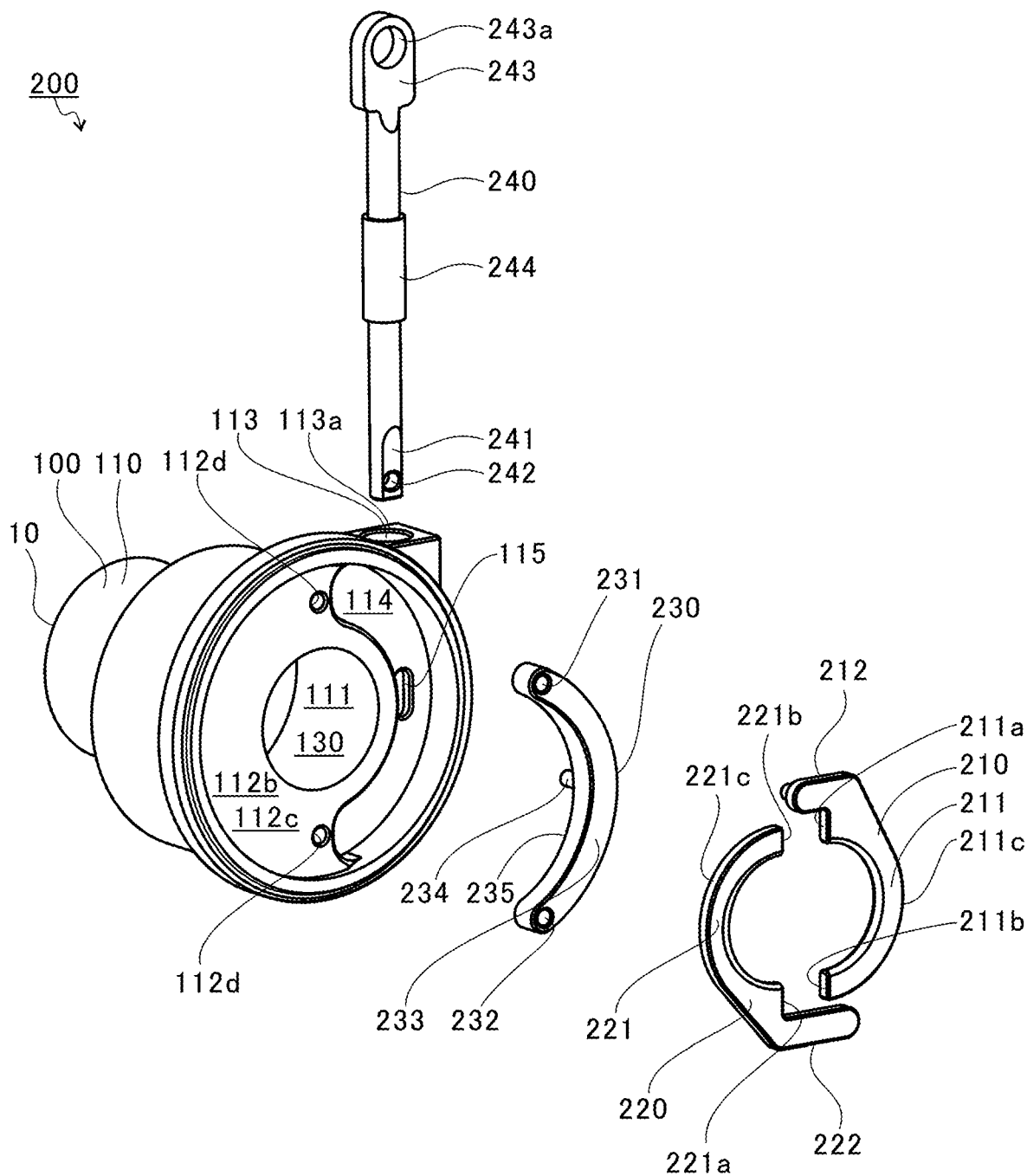
FIG. 3 shows an exploded perspective view of components of a link mechanism.

FIG. 3 shows an exploded view of components of a link mechanism 200 (throttling mechanism). In FIG. 3, only the first housing member 110 of the compressor housing 100 is shown. As shown in FIG. 3, the link mechanism 200 includes the compressor housing 100, a first throttling member 210 (throttling member), a second throttling member 220 (throttling member), a connecting member 230, and a rod 240.

The first throttling member 210 includes a curved portion 211. The curved portion 211 has a substantially semicircular arc shape. In the curved portion 211, one end surface 211a and the other end surface 211b in the rotational direction extend parallel to the radial direction and the rotational axis direction. However, the one end surface 211a and the other end surface 211b may be inclined with respect to the radial direction and the rotational axis direction.

The curved portion 211 includes an arm part 212 at a portion including the one end surface 211a. The arm portion 212 extends radially outward from an outer peripheral surface 211c of the curved portion 211. The arm portion 212 extends in a direction inclined with respect to the radial direction (a direction toward the second throttling member 220).

The second throttling member 220 has a curved portion 221. The curved portion 221 has a substantially semicircular arc shape. In the curved portion 221, one end surface 221a and the other end surface 221b in the rotational direction extend parallel to the radial direction and the rotational axis direction. However, the one end surface 221a and the other end surface 221b may be inclined with respect to the radial direction and the rotational axis direction.

The curved portion 221 includes an arm part 222 at a portion including the one end surface 221a. The arm portion 222 extends radially outward from an outer peripheral surface 221c of the curved portion 221. The arm portion 222 extends in a direction inclined with respect to the radial direction (a direction toward the first throttling member 210).

The curved portion 211 and the curved portion 221 face each other across the center of rotation of the compressor impeller 9 (intake flow path 130). The one end surface 211a of the curved portion 211 and the other end surface 221b of the curved portion 221 face each other. The other end surface 211b of the curved section 211 and the one end surface 221a of the curved section 221 face each other.

The connecting member 230 is located closer to the inlet 10 with respect to the first and second throttling members 210 and 220. The connecting member 230 has a substantially arc shape. Bearing holes 231 and 232 are formed at one end and the other end of the connecting member 230 in the rotational direction. In the connecting member 230, the bearing holes 231 and 232 open on an end surface 233 facing the first throttling member 210 and the second throttling member 220. The bearing holes 231 and 232 extend in the rotational axis direction. In this embodiment, the bearing holes 231 and 232 are non-through holes. However, the bearing holes 231, 232 may penetrate the connecting member 230 in the rotational axis direction.

A rod connection portion 234 is provided between the bearing holes 231 and 232 in the connecting member 230. In the connecting member 230, the rod connection portion 234 is provided on an end surface 235 opposite to the first throttling member 210 and the second throttling member 220. The rod connection portion 234 protrudes in the rotational axis direction from the end surface 235. The rod connecting portion 234 has, for example, a substantially cylindrical shape.

The rod 240 has a substantially cylindrical shape. A flat portion 241 is formed at one end of the rod 240. The flat part 241 extends in a plane substantially perpendicular to the rotational axis direction. A bearing hole 242 is opened in the flat part 241. The bearing hole 242 extends in the rotational axis direction. A connecting portion 243 is provided at the other end of the rod 240. The connecting portion 243 has a connecting hole 243a. An actuator, which will be described later, is connected to the connecting portion 243. The bearing hole 242 may be, for example, an elongated hole having a longer length in a direction perpendicular to the rotational axis direction and an axis direction of the rod 240 (left-right direction in FIG. 5 described later) than that in the axis direction of the rod 240.

A rod large diameter portion 244 is formed between the flat portion 241 and the connecting portion 243 of the rod 240. In the rod 240, an outer diameter of the rod large diameter portion 244 is larger than those of portions contiguous to the flat portion 241 and the connecting portion 243 with respect to the rod large diameter portion 244.

An insertion hole 113 is formed in the first housing member 110. One end 113a of the insertion hole 113 opens to the outside of the first housing member 110. For example, the insertion hole 113 extends in a plane direction perpendicular to the rotational axis direction. The insertion hole 113 is located outside the through hole 111 (intake flow path 130) in the radial direction. A portion including the flat part 241 of the rod 240 is inserted into the insertion hole 113. The rod large diameter portion 244 is guided by the inner wall of the insertion hole 113 of the first housing member 110. Accordingly, a movement of the rod 240 is restricted in directions other than a central axis direction of the insertion hole 113 (a central axis direction of the rod 240).

A accommodation hole 114 is formed in the first housing member 110. The accommodation hole 114 opens in the wall 112c of the accommodation groove 112b. The accommodation hole 114 is recessed from the wall 112c toward the inlet 10 (so as to be spaced apart from the second housing member 120). The accommodation hole 114 has a substantially arc shape when seen from the rotational axis direction. The accommodation hole 114 extends longer in the rotational direction than the connecting member 230 in the wall 112c. The accommodation hole 114 is spaced apart from the bearing holes 231 and 232 in the rotational axis direction. The accommodation hole 114 is located closer to the second housing member 120 (first throttling member 210) with respect to the insertion hole 113.

A connecting hole 115 is formed in the first housing member 110. The connecting hole 115 connects the insertion hole 113 with the accommodation hole 114. The connecting hole 115 is approximately formed in the middle part of the accommodation hole 114 in the rotational direction. The connecting hole 115 extends substantially parallel to the extending direction of the insertion hole 113. The width of the connecting hole 115 in a plane direction perpendicular to the extending direction of the insertion hole 113 and the rotational axis direction is larger than an outer diameter of the rod connection portion 234 of the connecting member 230. The connecting hole 115 is an elongated hole having a width in the extending direction of the insertion hole 113 that is greater than a width in the plane direction perpendicular to the extending direction of the insertion hole 113 and the rotational axis direction.

The connecting member 230 is housed in the accommodation hole 114. The accommodation hole 114 is longer in the rotational direction and wider in the radial direction than the connecting member 230. Accordingly, the connecting member 230 is allowed to move in the plane direction perpendicular to the rotational axis direction inside the accommodation hole 114.

The rod connection portion 234 is inserted through the connecting hole 115 into the insertion hole 113. The bearing hole 242 of the rod 240 inserted into the insertion hole 113 is opposite the connecting hole 115. The rod connection portion 234 is inserted into (connected to) the bearing hole 242. The rod connection portion 234 is supported by the bearing hole 242.

Figure 4:
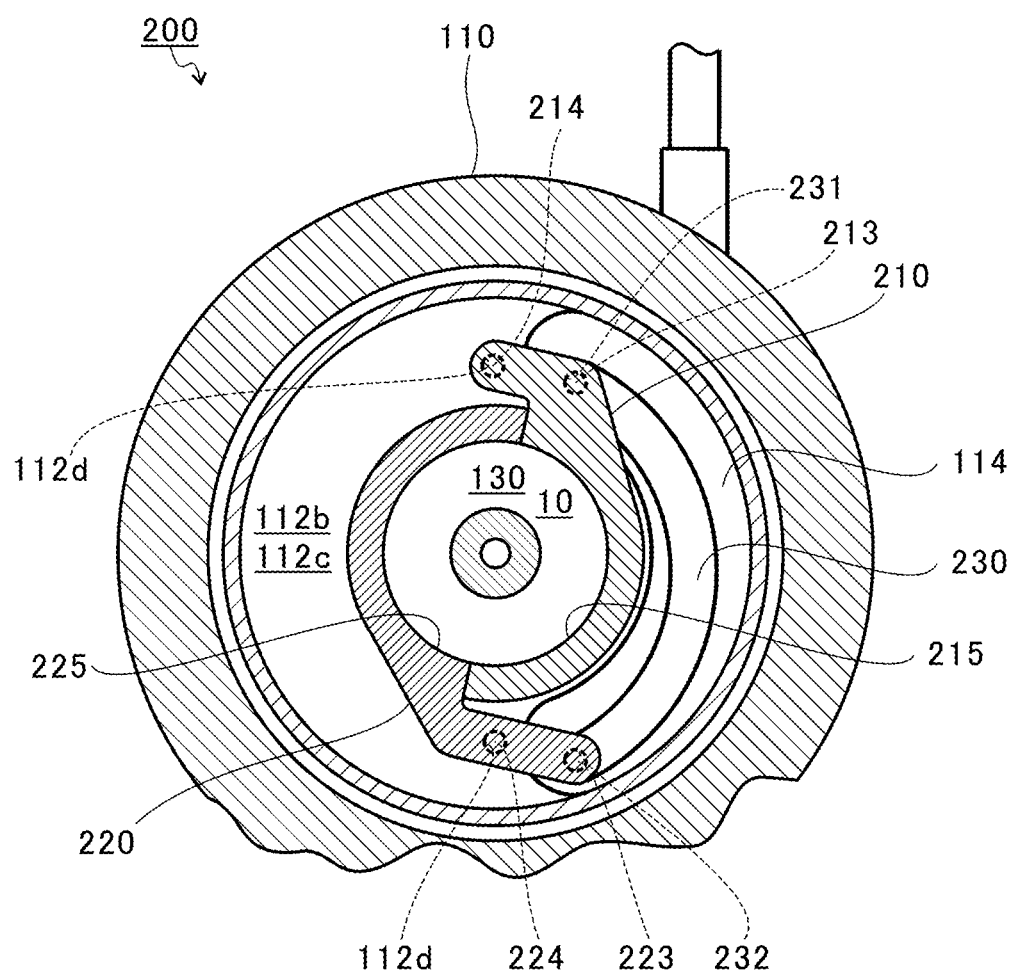
FIG. 4 shows a cross-sectional view taken along line IV-IV in FIG. 2.

FIG. 4 is a cross-sectional view taken along line IV-IV in FIG. 2. As shown in dashed lines in FIG. 4, the first throttling member 210 has a connecting shaft portion 213 and a rotational shaft portion 214. In the first throttling member 210, the connecting shaft portion 213 and the rotational shaft portion 214 protrude in the rotational axis direction from an end surface closer to the inlet 10 (closer to the wall 112c of the accommodation groove 112b).

The connecting shaft portion 213 and the rotational shaft portion 214 extend to the back side of the paper in FIG. 4. The rotational shaft portion 214 extends parallel to the connecting shaft portion 213.

An outer diameter of the connecting shaft portion 213 is smaller than an inner diameter of the bearing hole 231 of the connecting member 230. The connecting shaft portion 213 is inserted into the bearing hole 231. The connecting shaft portion 213 is supported by the bearing hole 231. An outer diameter of the rotational shaft portion 214 is smaller than an inner diameter of the bearing hole 112d of the first housing member 110. The rotational shaft portion 214 is inserted into one of the bearing holes 112d. The rotational shaft portion 214 is supported by the bearing hole 112d (see FIG. 2). In other words, the rotational shaft portion 214 connects the first throttling member 210 to the wall 112c that is opposite to the first throttling member 210 in the rotational axis direction.

The second throttling member 220 has a connecting shaft portion 223 and a rotational shaft portion 224. In the second throttling member 220, the connecting shaft portion 223 and the rotational shaft portion 224 protrude in the rotational axis direction from an end surface closer to the inlet 10 (closer to the wall 112c of the accommodation groove 112b). The connecting shaft portion 223 and the rotational shaft portion 224 extend to the back side of the paper in FIG. 4. The rotational shaft portion 224 extends parallel to the connecting shaft portion 223.

An outer diameter of the connecting shaft 223 is smaller than an inner diameter of the bearing hole 232 of the connecting member 230. The connecting shaft portion 223 is inserted into the bearing hole 232. The connecting shaft portion 223 is supported by the bearing hole 232. An outer diameter of the rotational shaft portion 224 is smaller than an inner diameter of the bearing hole 112d. The rotational shaft portion 224 is inserted into the other bearing hole 112d. The rotational shaft portion 224 is supported by the bearing hole 112d (see FIG. 2). In other words, the rotational shaft portion 224 connects the second throttling member 220 to the wall 112c that is opposite to the second throttling member 220 in the rotational axis direction.

Accordingly, the link mechanism 200 includes a four-bar linkage. The four links (nodes) are the first throttling member 210, the second throttling member 220, the first housing member 110, and the connecting member 230. Since the link mechanism 200 includes the four-bar linkage, it is a limited chain and has one degree of freedom, making it easy to control.

Figure 5:
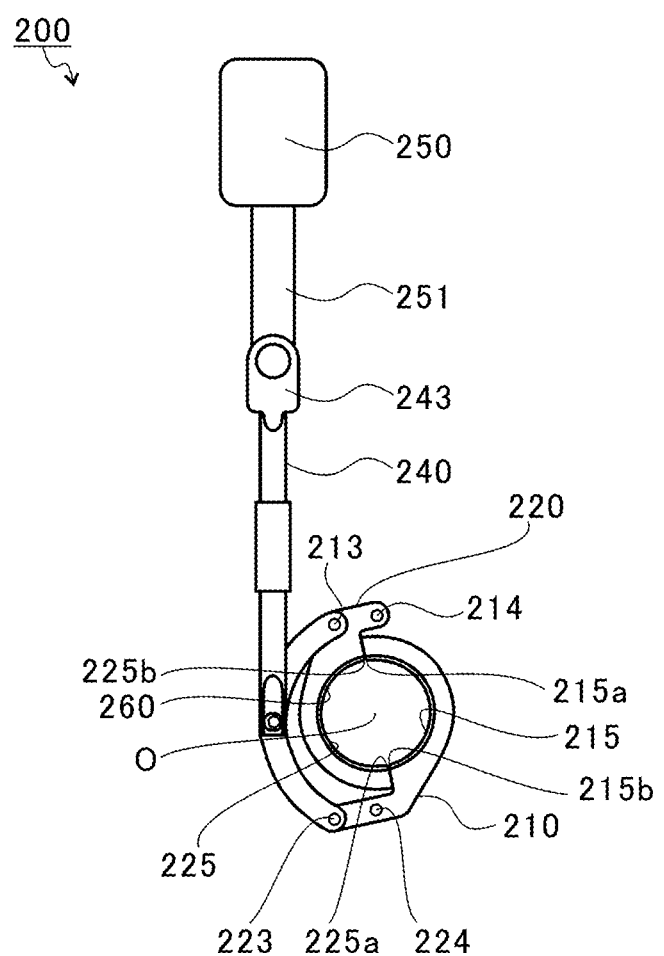
FIG. 5 shows a first illustration of an operation of the link mechanism (throttling mechanism).

FIG. 5 shows a first illustration of an operation of the link mechanism 200. In the following FIG. 5, FIG. 6 and FIG. 7, views seen from the inlet 10 are shown. As shown in FIG. 5, one end of a drive shaft 251 of an actuator 250 is connected to the connecting portion 243 of the rod 240.

In the arrangement shown in FIG. 5, the first throttling member 210 and the second throttling member 220 are in contact with each other. At this time, as shown in FIGS. 2 and 4, a protruding portion 215 that is an inner portion in the radial direction of the first throttling member 210 protrudes into the intake flow path 130. A protruding part 225 that is an inner portion in the radial direction of the second throttling member 220 protrudes into the intake flow path 130. The positions of the first and second throttling members 210 and 220 at this time are referred to as a throttle position.

In the throttle position, end portions 215a and 215b of the protruding portion 215 in the rotational direction and end portions 225a and 225b of the protruding portion 225 in the rotational direction contact with each other. The protruding portion 215 and the protruding portion 225 form an annular hole 260. An inner diameter of the annular hole 260 is smaller than an inner diameter of the portion of the intake flow path 130 where the protruding portions 215 and 225 protrude. For example, the inner diameter of the annular hole 260 is smaller than the inner diameter of any part of the intake flow path 130.

Figure 6:
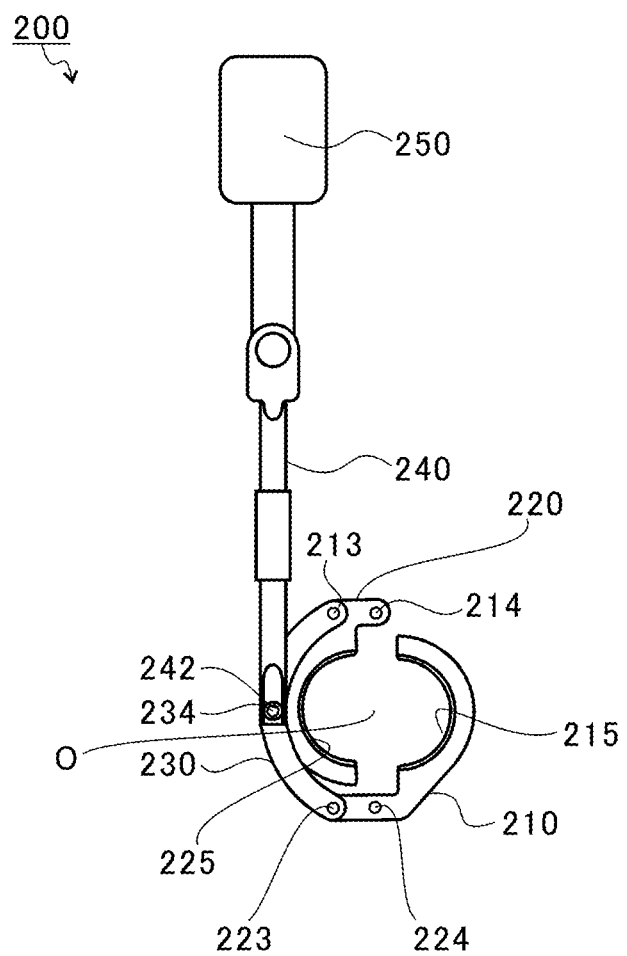
FIG. 6 shows a second illustration of the operation of the link mechanism.
Figure 7:
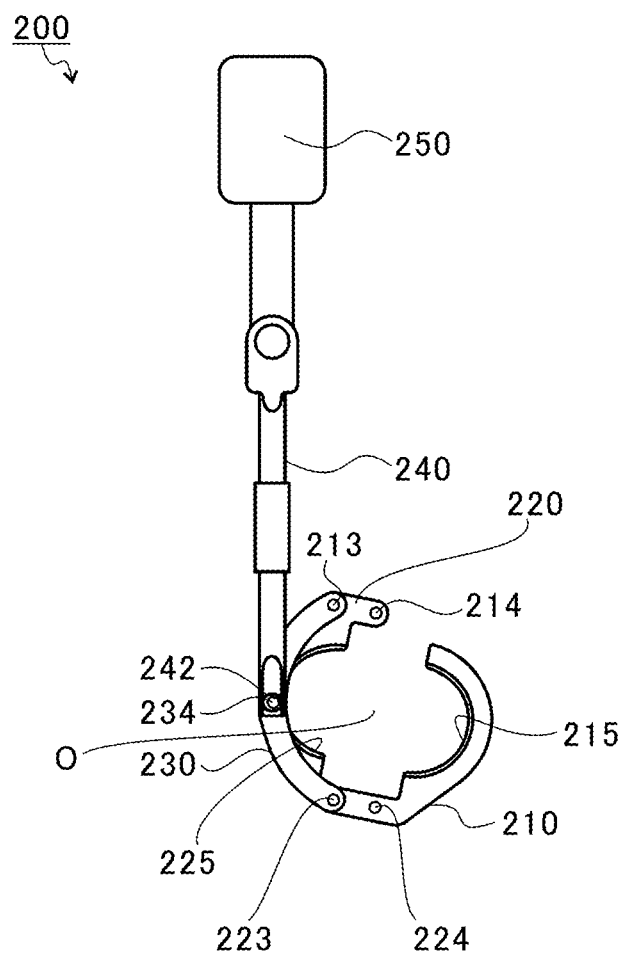
FIG. 7 shows a third illustration of the operation of the link mechanism.

FIG. 6 is a second illustration of the operation of the link mechanism 200. FIG. 7 is a third illustration of the operation of the link mechanism 200. The actuator 250 linearly moves the rod 240 in the direction intersecting the rotational axis direction (up and down direction in FIGS. 6 and 7). The rod 240 moves upward from the state shown in FIG. 5. The amount of movement of the rod 240 relative to the arrangement shown in FIG. 5 is larger in the arrangement shown in FIG. 7 than in the arrangement shown in FIG. 6.

When the rod 240 moves, the connecting member 230 also moves upward in FIGS. 6 and 7 via the rod connecting portion 234. At this time, the connecting member 230 is allowed to rotate around the rod connecting portion 234 as a center of rotation. In addition, there is a small amount of play in the inner diameter of the bearing hole 242 of the rod 240 with respect to the outer diameter of the rod connecting part 234. Therefore, a movement of the connecting member 230 is slightly allowed in the plane direction perpendicular to the rotational axis direction.

As described above, the link mechanism 200 is a four-bar linkage, and the connecting member 230, the first throttling member 210 and the second throttling member 220 show a behavior with one degree of freedom, with respect to the first housing member 110. Specifically, the connecting member 230 slightly moves in the left-right direction while slightly rotating in the counterclockwise direction in FIGS. 6 and 7 within the above-described allowable range.

The rotational shaft portion 214 of the first throttling member 210 is supported by the first housing member 110, and thus a movement is restricted in the plane direction perpendicular to the rotational axis direction. The connecting shaft portion 213 is supported by the connecting member 230. Since the connecting member 230 is allowed to move, the connecting shaft portion 213 is movable in the plane direction perpendicular to the rotational axis direction. As a result, as the connecting member 230 moves, the first throttling member 210 rotates in the clockwise direction in FIGS. 6 and 7 around the rotational shaft portion 214 as the rotation center.

Similarly, the rotational shaft portion 224 of the second throttling member 220 is supported by the first housing member 110, and thus a movement is restricted in the plane direction perpendicular to the rotational axis direction. The connecting shaft portion 223 is supported by the connecting member 230. Since the connecting member 230 is allowed to move, the connecting shaft portion 223 is movable in the plane direction perpendicular to the rotational axis direction. As a result, as the connecting member 230 moves, the second throttling member 220 rotates in the clockwise direction in FIGS. 6 and 7 around the rotational shaft portion 224 as the rotation center.

Thus, the first throttling member 210 and the second throttling member 220 move in directions spaced apart from each other, in the order of FIG. 6 and FIG. 7. From the throttle position, the protruding portions 215 and 225 move radially outward (retracted position). In the retracted position, for example, the protruding portions 215 and 225 are flush with the inner wall surface of the intake flow path 130, or are located radially outside the inner wall surface of the intake flow path 130. When moving from the retracted position to the throttle position, the first throttling member 210 and the second throttling member 220 approach and contact with each other in the order of FIG. 7, FIG. 6, and FIG. 5. In this way, the first throttling member 210 and the second throttling member 220 are switched between the throttle position and the retracted position according to the rotation angle around the rotational shaft portions 214 and 224 as the rotation centers.

Figure 8:
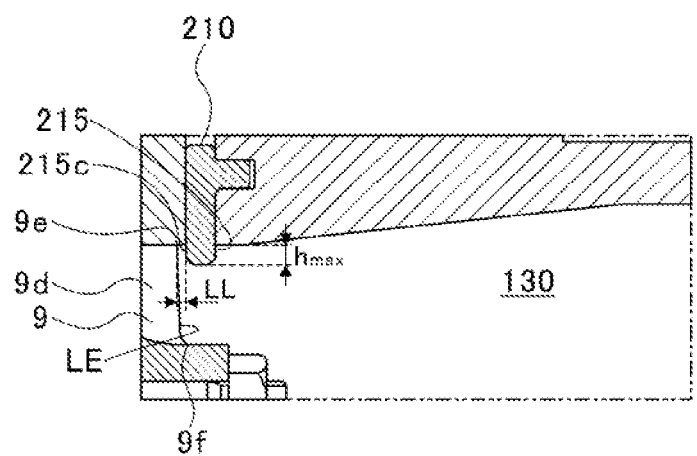
FIG. 8 shows an extraction of an area enclosed by the double-dotted line in FIG. 2.

FIG. 8 is an extraction of an area enclosed by a double-dotted chain line in FIG. 2. In the following, the first throttling member 210 is explained as an example, but the second throttling member 220 has the same configuration (arrangement) as the first throttling member 210. In FIG. 8, the first throttling member 210 is in the throttle position. In the throttle position, the protruding portion 215 of the first throttling member 210 and the protruding portion 225 of the second throttling member 220 protrude most radially inwardly into the intake flow path 130.

The protruding portion 215 of the first throttling member 210 has an opposing surface 215c. The opposing surface 215c faces the leading edge LE of the blade 9d of the compressor impeller 9. The leading edge LE is the upstream end of the blade 9d in the air flow direction. In this embodiment, the leading edge LE is inclined with respect to the radial direction. The leading edge LE moves to the left (toward bearing 6, or spaced apart from the inlet 10) in FIG. 8 as moving radially outward. However, the leading edge LE may be parallel to the radial direction.

An outer peripheral end 9e of the leading edge LE is the most radially outward part of the leading edge LE. In this case, the outer peripheral end 9e is located leftmost (closest to the bearing 6, or most spaced apart from the inlet 10) in the leading edge LE in FIG. 8.

An inner peripheral end 9f of the leading edge LE is the most radially inner part of the leading edge LE. In this case, the inner peripheral end 9f is located rightmost (closest to the inlet 10, or most spaced apart from the bearing 6) in the leading edge LE in FIG. 8.

The outer peripheral end 9e is positioned left with respect to the opposing surface 215c of the protruding portion 215 in the axial direction in FIG. 8. The inner peripheral end 9f is positioned right with respect to the opposing surface 215c of the protruding portion 215 in the axial direction in FIG. 8. In other words, the opposing surface 215c is provided between a position of the outer peripheral end 9e of the leading edge LE and a position of the inner peripheral end 9f of the leading edge LE in the axial direction. This allows the outer peripheral end 9e to be brought closer to the protruding portion 215 even when the leading edge LE has a shape that is inclined with respect to the direction perpendicular to the axial direction.

As shown in FIG. 8, a distance (shortest distance, axial distance) between the opposing surface 215c of the protruding portion 215 of the first throttling member 210 and the outer peripheral end 9e of the leading edge LE is defined as a distance LL. A maximum protrusion height (height at the throttle position) of the protruding portion 215 protruding from the inner wall surface of the intake flow path 130 is defined as a height $h_{max}$.

Figure 9:
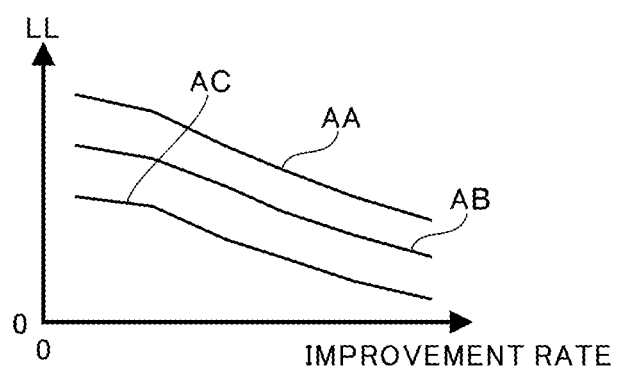
FIG. 9 shows a relationship between a distance and an improvement rate of thermal insulation efficiency.

FIG. 9 shows the relationship between distance LL and the improvement rate of thermal insulation efficiency. In FIG. 9, the vertical axis indicates the above-described distance LL. The horizontal axis indicates the improvement rate of the thermal insulation efficiency. In this embodiment, the improvement rate of the thermal insulation efficiency indicates the percentage of improvement (increase) of the thermal insulation efficiency by moving the first throttling member 210 and the second throttling member 220 to the throttling position compared to the thermal insulation efficiency in the fully open position. In the fully open position, the protruding portion 215 of the first throttling member 210 and the protruding portion 225 of the second throttling member 220 are located most radially outward (e.g., radially outward from the intake flow path 130).

In FIG. 9, legends AA, AB, and AC have different air compression ratios from each other. The compression ratio of the legend AA is the lowest and that of the legend AC is the highest. As shown in FIG. 9, the improvement rate of thermal insulation efficiency is higher when the distance LL is smaller for any compression ratios. In other words, the closer the first throttling member 210 is to the leading edge LE, the higher the improvement rate of the insulation efficiency is.

Figure 10:
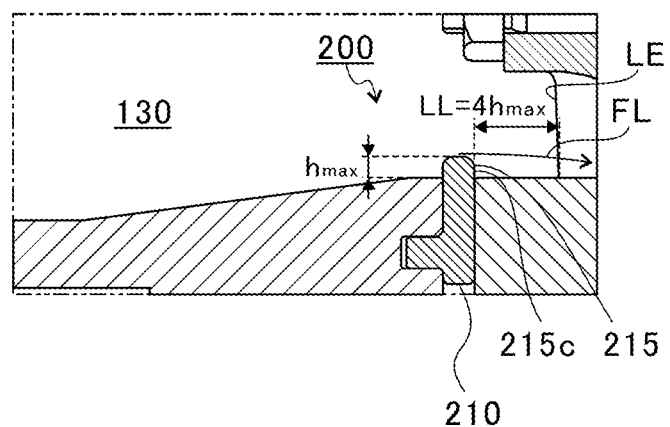
FIG. 10 shows an area where a protruding portion of a first throttling member is positioned.

FIG. 10 shows an area where the protruding portion 215 of the first throttling member 210 is disposed. In FIG. 10, the top, bottom, left and right sides are reversed with respect to FIG. 8 so that the correspondence with FIG. 11 can be easily understood. The air throttled by the protruding portion 215 and separated from the inner wall of the intake flow path 130 flows in the rotational axis direction while gradually spreading outward in the radial direction as shown by an arrow FL in FIG. 10. At this time, it is known that the following Formula 1 is satisfied in the flow of the separated air. Note that a distance X indicates a distance between the opposing surface 215c of the protruding part 215 and a position where the separated air re-reaches the inner wall surface of the intake flow path 130, and Re indicates the Reynolds number.

[Formula 1]

$$\frac{X}{h_{max}} = \log(\text{Re}^2) \quad (10^4 < \text{Re} < 10^7) \quad \text{(Formula 1)}$$

Figure 11:
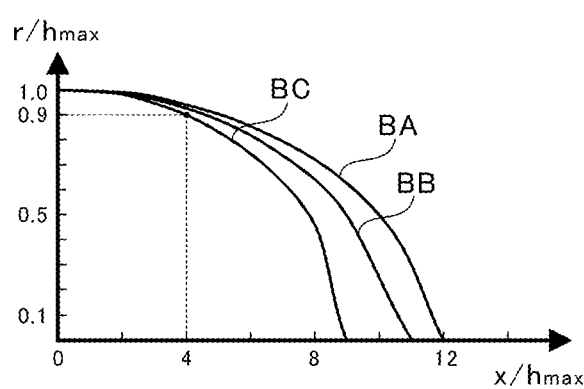
FIG. 11 shows a result of a simulation of an air flow separation based on Formula 1.

FIG. 11 shows a result of a simulation of an air flow separation based on Formula 1. In FIG. 11, the horizontal axis is the ratio obtained by dividing the distance x toward the downstream with the opposing surface 215c as 0 by the above-described height $h_{max}$ of the protruding portion 215 (hereinafter referred to as the ratio x). The vertical axis is the ratio obtained by dividing the distance r from the inner wall surface of the intake flow path 130 to the radially inner side by the above-described height $h_{max}$ of the protruding portion 215.

Legends BA, BB, and BC have different air flow velocities from each other. The legend BA has the highest flow velocity and the legend BC has the lowest velocity. As shown in FIG. 11, for any flow velocities, when the ratio x exceeds 4, the air rapidly expands and flows radially outward. In contrast, when the ratio x is equal to or less than 4, the air expands radially outward only up to 10% or less of the height $h_{max}$ of the protruding portion 215.

Accordingly, in the link mechanism 200, the first throttling member 210 is arranged at a position where the distance LL between the opposing surface 215c of the protruding portion 215 of the first throttling member 210 and the outer edge 9e of the leading edge LE is equal to or less than four times the height $h_{max}$ of the protruding portion 215, as shown in FIG. 10. In other words, the leading edge LE is located in the area where the ratio x is 4 or less with respect to the opposing surface 215c of the protruding portion 215.

As a result, the air passing through the protruding portion 215 reaches the leading edge LE before substantially expanding radially outward. In other words, compression by the compressor impeller 9 is possible while the effect of the throttling by the first throttling member 210 remains sufficient. In addition, the above-mentioned positional relationship between the protruding portion 215 and the leading edge LE increases the flow velocity near the inner to middle position in the radial direction of the leading edge LE, and the inflow angle is improved. As a result, an amount of work near the shroud 121a of the compressor impeller 9 that is no longer obtained can be compensated by an amount of work in the vicinity of the inner to middle position in the radial direction of the leading edge LE.

The embodiment of the present disclosure has been described with reference to the accompanying drawings, but the present disclosure is not limited thereto. It is clear that those skilled in the art can conceive of various changes or modifications within the scope of the claims, and they are also included in the technical scope of the present disclosure.

For example, in the above embodiment, the first throttling member 210 and the second throttling member 220 are included as the throttling member. However, it is sufficient that at least one of the first throttling member 210 or the second throttling member 220 is provided. Furthermore, three or more throttling members may be provided.

The link mechanism 200 described in the above embodiment is only an example of the throttling mechanism. The throttling mechanism can be any mechanism as long as it can change the radial position of the throttling member and move it to the throttle position and the retracted position (fully open position).

In the embodiment described above, the opposing surface 215c is located between a position of the outer peripheral end 9e of the leading edge LE and a position of the inner peripheral end 9f of the leading edge LE in the axial direction. In other words, the outer peripheral end 9e and the inner peripheral end 9f are positioned opposite to each other in the axial direction across the opposing surface 215c. However, the inner peripheral end 9f may be located at a position radially extended from the opposing surface 215c. Furthermore, the inner peripheral end 9f may also be located closer to the outer peripheral end 9e with respect to the opposing surface 215c.

What is claimed is:

1. A centrifugal compressor comprising:
    an impeller including a main body portion and a plurality of blades provided on an outer peripheral surface of the main body portion;
    an intake flow path facing the impeller in a rotational axis direction; and
    a throttling mechanism including a throttling member provided in the intake flow path, the throttling member being movable in a radial direction of the impeller and switched between a throttle position where the throttling member protrudes into the intake flow path and a retracted position that is radially outside the throttle position, a ratio obtained by dividing a distance between an outer peripheral end of a leading edge of each of the plurality of blades and the throttling member by a maximum protruding height of the throttling member protruding from all inner wall surface of the intake flow path is equal to or less than 4.

2. The centrifugal compressor according to claim 1,
wherein the throttling member includes an opposing surface facing the outer peripheral end in an axial direction of the impeller, and
the opposing surface is located between a position of the outer peripheral end and a position of an inner peripheral end of the leading edge in the axial direction.

3. A turbocharger comprising the centrifugal compressor according to claim 1.

4. A turbocharger comprising the centrifugal compressor according to claim 2.

5. A centrifugal compressor comprising:
an impeller including a main body portion and a plurality of blades provided on an outer peripheral surface of the main body portion;
an intake flow path facing the impeller in a rotational axis direction; and
a throttle provided in the intake flow path, the throttle being movable in a radial direction of the impeller and switched between a throttle position where the throttle protrudes into the intake flow path and a retracted position that is radially outside the throttle position, a ratio obtained by dividing a distance between an outer peripheral end of a leading edge of each of the plurality of blades and the throttle by a maximum protruding height of the throttle protruding from an inner wall surface of the intake flow path is equal to or less than 4.

6. The centrifugal compressor according to claim 5,
wherein the throttle includes an opposing surface facing the outer peripheral end in an axial direction of the impeller, and
the opposing surface is located between a position of the outer peripheral end and a position of an inner peripheral end of the leading edge in the axial direction.

7. A turbocharger comprising the centrifugal compressor according to claim 5.

8. A turbocharger comprising the centrifugal compressor according to claim 6.

* * * * *